United States Patent [19]

Ibbott

[11] Patent Number: 5,234,555
[45] Date of Patent: Aug. 10, 1993

[54] METHOD AND APPARATUS FOR IONIZING FLUIDS UTILIZING A CAPACITIVE EFFECT

[76] Inventor: Jack K. Ibbott, 17-7, Nishiazabu 4-chome, Minato-ku, Tokyo 106, Japan

[21] Appl. No.: 649,461

[22] Filed: Feb. 5, 1991

[51] Int. Cl.$^5$ ............................. C02F 5/00; C02F 1/00
[52] U.S. Cl. .................................. 204/150; 204/130; 204/186; 204/248; 204/272; 204/302
[58] Field of Search ............... 204/150, 130, 149, 186, 204/248, 272, 302

[56] References Cited

U.S. PATENT DOCUMENTS

| | | | |
|---|---|---|---|
| 3,801,492 | 4/1974 | King | 204/302 |
| 3,871,989 | 3/1975 | King | 204/299 |
| 4,073,712 | 2/1978 | Means et al. | 204/186 |
| 5,102,515 | 4/1992 | Ibbott | 204/150 |

*Primary Examiner*—John Niebling
*Assistant Examiner*—Arun S. Phasge
*Attorney, Agent, or Firm*—Wenderoth, Lind & Ponack

[57] ABSTRACT

The present invention is drawn to a method and apparatus for treating electrically conductive fluid. In once such apparatus, positive and negative electrodes of electrically conductive materials having different electrochemical potentials are spaced apart. At least one of the electrodes has a covering of electrically insulative material extending substantially therearound. Thus, the only electroconductive connection that develops an electrochemical potential between the electrodes is established by a capacitive effect through the fluid to be treated, which fluid is passed between the electrodes. Accordingly, when a body of electrically conductive fluid to be treated is interposed between the electrodes, an electroconductive connection between the electrodes is established through the body of fluid by a capacitive effect and the fluid is ionized. In the apparatus above, by providing at least one of the electrodes with a covering of electrically insulative material, current flow between the electrodes is inhibited which contributes to the efficiency of the apparatus in ionizing fluid, even fluid having a high degree of electroconductive capability.

21 Claims, 3 Drawing Sheets

METHOD AND APPARATUS FOR IONIZING FLUIDS UTILIZING A CAPACITIVE EFFECT

BACKGROUND OF THE INVENTION

The present invention relates to a method and apparatus for treating electrically conductive fluid, that is fluid having some electroconductive capability. More particularly, the present invention relates to a method and apparatus utilizing a capacitive effect for ionizing water having a high mineral content to prevent the precipitation of solids from the water which would tend to form a scale on the inner surface of piping through which the water flows, and to aid in the removal of a previously formed scale.

It has been known in the past to use chemicals for cleaning a scale from fluid piping, which scale was formed by the deposition of the soluble content of the fluid passing through the piping. However, the waste products of such chemical treatment are becoming hazardous to the ecology, and give rise to other harmful effects. Therefore, many methods and apparatus which do not use chemicals have been developed for the treatment of fluid, and which methods and apparatus give rise to no residual harmful effects. Such systems typically employ magnetic or electric energy to treat the fluid.

In the systems employing electric energy, electrodes having different electrochemical potentials are employed, and a resistor is connected between the electrodes. The fluid to be treated is passed between the electrodes and in direct contact therewith. The resistor is employed as a current control device so as to establish an appropriate electroconductive connection between the electrodes through the electroconductive fluid to be treated, whereby the fluid becomes ionized.

However, all of the known non-chemical systems for treating fluid possess a degree of unreliability due to wide variations in the conditions of the fluid to be treated, such as the electroconductivity of the fluid, soluble content of the fluid, pH, etc.

The present inventor has conducted research into the development of non-chemical fluid treatment apparatus and methods using a pair of electrodes having different electrochemical potentials to ionize fluid.

In conducting such research, the present inventor has carried out tests which illustrate that when electric current flowing through the fluid to be treated and between the electrodes is reduced, there is an improvement in the ability of the device to prevent the precipitation of solids (Ca, Mg and Si) dissolved in the fluid and thus prevent the formation of a scale, particularly a silica scale which is the most difficult type of scale to prevent. In such tests, it was observed that the precipitation of Ca, Mg and Si particles commences very early when there was a direct electrical connection between the electrodes, i.e. maximum current flow. When the resistance between the electrodes was increased to successively reduce the electric current flow, it was observed that the precipitation of the Ca, Mg and Si particles became further and further delayed along with a corresponding reduction in the amount of precipitative material and hence a reduction in the formation of a crystalline scale. As these tests were continued, and the values of resistance was increased to reduce the electric current flow, the formation of a Ca, Mg and Si precipitate ceased and only a colloidal suspension was observed. And, with an even further increase in resistance between the electrodes, even the colloidal suspension began to form more slowly and then only in water having a high degree of hardness and greater electroconductive capability. Such tests are disclosed in more detail in copending appln. U.S. Ser. No. 07/556,170 filed Jul. 20, 1990.

However, with an increase in electroconductivity of the fluid to be treated, there is a corresponding increase in the current flow between the electrodes. Accordingly, it follows that fluids with a high electroconductive capability are very difficult to effectively treat with such systems because they give rise to a relatively high electric current flow resulting in an accompanying lowering of the efficiency of the system.

Thus, in a unique embodiment featured in U.S. Pat. No. 4,902,391 by the present inventor, the electroconductive connection between the electrodes was only established by the fluid to be treated extending therebetween, thereby providing a structure in which minimum current flow and maximum potential difference between the electrodes was expected.

The present invention, representing a development from the above-described patented and pending devices, is drawn to a method and apparatus for treating even fluid having a high electroconductive capability by relying on the relationship found by the present inventor between the degree of effectiveness of the fluid treatment and the amount of current flow through the fluid as produced by the device. More specifically, the present invention is the result of research by the present inventor into means of further restricting electric current flow through the fluid to be treated so as to arrive at an appropriate method and apparatus for treating fluids having various electroconductive capabilities, even very high electroconductive capabilities.

SUMMARY OF THE INVENTION

An object of the present invention is to provide a method and apparatus for treating electrically conductive fluid between electrodes, in which method and apparatus the at least one of the electrodes is sealed against direct contact with the fluid being treated so that substantially no current is generated during the ionization of the electrically conductive fluid whereby the precipitation of dissolved solids in even fluid having a high dissolved solid content level and high electroconductivity level can be prevented.

The above object is achieved according to the present invention by the use of a "capacitive effect" to effect the ionization of the fluid to be treated.

More particularly, the present invention provides a method and apparatus for treating electrically conductive fluid employing electrodes of electrically conductive materials having different electrochemical potentials, at least one of which electrodes having a covering of electrically insulative material extending around substantially the entirety thereof so as to seal the at least one electrode from direct contact with the fluid to be treated such that an electroconductive connection that develops an electroconductive potential between the electrodes is established through the body of fluid by a capacitive effect. In this method and apparatus the current flow through the fluid is self-generated owing to the electroconductivity of the fluid to be treated and the different electrochemical potentials of the electrodes, whereby minimum current flow and maximum potential difference between the electrodes is established.

As discussed above, in known devices the fluid to be treated comes in direct contact with the electroconductive material of the electrodes, and a voltaic cell effect is generated in which the fluid acts as an electrolyte so that a small voltage is applied across the electrodes to ionize the fluid. When the electroconductivity of the fluid itself is relatively small, the current flow in the system was correspondingly small. However, when the electroconductivity of the fluid was relatively high, the current flow was correspondingly high resulting in poor efficiency of the system with respect to ionizing the fluid. In the method and apparatus according to the present invention, the sealing of at least one of the electrodes prevents direct contact of the fluid with such at least one electrode so as to strongly limit the current flow even when the electroconductive capability of the fluid is high.

According to another feature of the present invention, a resistor or only an electrical lead wire may be connected between the electrodes as a control on the range of electroconductive properties of the fluid over which the system will be effective. It is noted that in the known fluid treatment devices in which the electroconductive materials of the electrodes are fully exposed to the fluid, a resistor has been connected between the electrodes as a current control device. Therefore, it can be seen that the function of the resistor in the context of the present invention is different from that of the resistor used when the electroconductive materials of the electrodes are fully exposed to contact with the fluid to be treated.

Moreover, the present invention also provides a method and apparatus for treating electrically conductive fluid employing first and second electrodes, at least one of which electrodes having a covering of electrically insulative material extending around substantially the entirety thereof so as to seal the at least one electrode from direct contact with the fluid to be treated, and means for connecting the electrodes to an external source of electric energy such that an electroconductive connection between the electrodes is established through the body of fluid also by a capacitive effect. In practice, the level of voltage applied to the electrodes will be in the order of only a few volts. The actual applied voltage is dependent on the range of the electroconductivity of the fluid to be treated.

BRIEF DESCRIPTION OF THE DRAWINGS

Further objects, features and advantages of the present invention will become apparent to those of ordinary skill in the art by reviewing the detailed description below of preferred embodiments in conjunction with the attached drawings, in which.

DETAILED DESCRIPTION OF THE PREFERRED EMBODIMENTS

It is well established that in electrical systems having a conductor defining an edge or a point, that there will be a build-up of electrons (electric energy concentration) at such an edge or point. Although this effect is mainly associated with high voltage systems, such an effect still is present in low voltage systems to a correspondingly small amount. Therefore, since the present invention was developed with an aim to reduce the amount of current flow between the electrodes (conductors) in the system for treating fluid, the above-described effect was considered in the following manner during the development of the present invention.

That is, it was realized that even in the fluid treatment apparatus of the present invention, the above-described effect could be observed as a build-up of a scale along sharp edges and points of the electrically conductive material of the electrodes exposed to the fluid. Because it is not desirable to have concentrations of electrical energy in the fluid treatment device, it was first considered to obviate such concentrations by rounding off all of the edges of the electrically conductive material, by removing all rough areas, etc. and by finally polishing the electrically conductive material of the electrodes. However, such procedures were found to be time consuming and expensive with respect to manufacturing costs. It was thus conceived to facilitate a reduction in the build-up of electrons at specific edges or points of the electrodes by removing all of the sharp edges, etc. of the electrodes only to a minimum extent and by additionally applying a coating of electrically insulative material around and along the edges, points etc.

Figure 1:
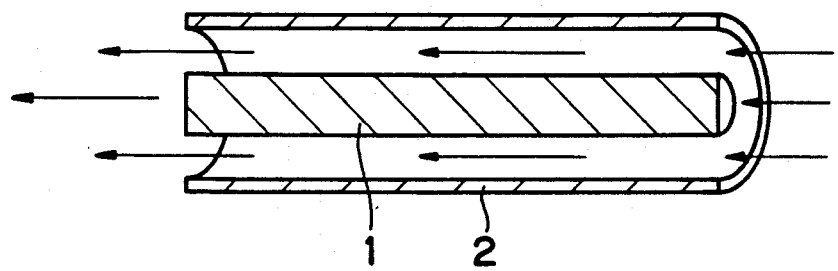
FIG. 1 is a perspective view, in section, of electrodes constituting, a constituent part of the present invention.

Referring now to FIG. 1 showing an example of a constituent element comprising electrodes of the present invention, the ends of a tubular negative aluminum electrode 2 and a rod-shaped positive carbon electrode 1 provide the most potential for the build-up of electrons and consequent release thereof, thereby facilitating a concentrated current flow between the electrodes. Initially, it was decided to merely apply a coating of electrically insulative material around the ends of the electrodes. This application could be accomplished by a simple method in which the electrodes were dipped into a fluid plastic medium which when dried left a homogeneous coating of electrical insulation over the ends of the electrodes. In this respect, the electrodes were dipped into the fluid plastic medium to only a small extent leaving an electrically insulative coating which extended only a few millimeters back from the ends of the electrodes. Tests were conducted with these electrodes which showed an obvious improvement over similar electrodes which did not have any electrical insulation over the electrode ends.

Further investigations revealed that more effective results could be achieved by dipping the electrodes further into the fluid plastic medium, i.e. by increasing the longitudinal amount to which the electrodes were covered with the electrical insulation. Such a finding then prompted the idea of providing the electrodes with a covering of electrical insulation substantially over the entirety thereof. Again, tests of electrodes having a covering of electrical insulation substantially over the entirety thereof showed that such electrodes could ionize fluid having a high electroconductive capability with a great deal of efficiency. These tests were carried out by a step-by-step process of sequentially increasing the coverage of the electrodes with an electrically insulative material and testing the effects of such electrically insulative material after each time the insulative material was applied over the electrodes.

These tests showed that the effectiveness of the device with fluids having high degrees of electroconductive capabilities was successively improved until the tubular aluminum electrode 2 was completely covered with the electrically insulative material such that there was no direct contact between the fluid to be treated and the electrically conductive material (aluminum) of the electrode.

It would be expected that there would be very little possibility of current flow being produced between the tubular aluminum electrode 2 and the rod-shaped carbon electrode 1 when one of the electrodes was completely sealed from the fluid to be treated by the covering of electrically insulative material. Even the existence of a voltage potential seemed doubtful to the present inventor. However, a very sensitive volt meter showed that there did in fact exist a voltage potential between the two electrodes described above.

Accordingly, after finding out that a voltage potential did exist with one electrode (aluminum electrode 2) being insulated, it was then decided to also examine what would occur if the electrically conductive material of the other electrode (carbon electrode) 1 were sealed as well against direct contact with the fluid to be treated. Testing of an apparatus in which the electrically conductive material of both the negative aluminum electrode and the positive carbon electrode were completely sealed against direct physical contact with the fluid to be treated by respective coverings of electrically insulative material showed a further improvement in the performance of the apparatus in the ionization of fluids having very high electroconductive capabilities. Again, a voltage measurement was taken to show the presence of a voltage potential between the electrodes.

In view of the fact that the presence of a voltage potential between the positive and negative electrodes was unexpected, because the electrically conductive materials of the electrodes were completely covered with electrically insulative material forming a seal against direct physical contact with the fluid to be treated, it was decided to more fully verify the existence of the voltage potential and ascertain whether there was in fact a complete seal of the electrically conductive material against the fluid to be treated.

A negative aluminum electrode was completely covered with electrically insulative material by dipping the electrode into a fluid plastic medium. The negative electrode was then partly immersed in water and a minute portion of the electrically conductive material was exposed at the end of the electrode and cleaned to allow the electrically conductive material to be connected to a sensitive meter for measuring electric resistance. A piece of uncovered aluminum was attached to the other pole of the meter and was partly immersed in the water together with the covered aluminum electrode. Under these conditions, the meter showed a reading of infinite electric resistance indicating that there was no direct physical contact of the water with the covered electrode.

The uncovered piece of aluminum was replaced with a piece of carbon, and a voltage reading of 0.9 volts was measured by a sensitive volt meter. As it had been previously confirmed that the electrically conductive material of the aluminum electrode was completely sealed against direct physical contact with the water, the above presence of a measurable voltage is postured to be due to a capacitive effect.

The same testing procedure was then carried out with a carbon electrode which was also covered with electrically insulative material. A voltage potential of 0.9 volts was measured by a sensitive volt meter when a covered negative aluminum electrode and a covered positive carbon electrode were both partly immersed in water with the exposed ends thereof connected to the volt meter.

Once having described the foundation upon which the effects of the present invention are believed to be based, preferred embodiments of the present invention will now be described with reference to FIGS. 2-7.

In FIGS. 2-5, reference numeral 1 designates a rod-shaped positive electrode of electrically conductive material (carbon) while reference numeral 2 designates a tubular negative electrode of electrically conductive material (aluminum) that is spaced (radially) from the electrically conductive material of the positive electrode 1. Such components are basically identical to that described above with reference to FIG. 1.

Figure 2:
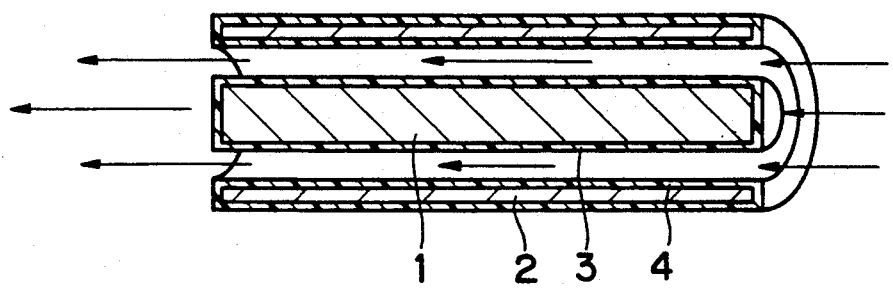
FIG. 2 is a perspective view, in section, of an embodiment of an apparatus for treating electrically conductive fluid according to the present invention.

In the embodiment of FIG. 2, each of the electrodes 1, 2 has a covering 3, 4 of electrically insulative material extending around the entirety thereof so that each of the electrodes 1, 2 are sealed from direct contact with a body of fluid to be treated in the apparatus. Any plastic material can be used as the insulative material. Non-toxic plastic has to be used when the apparatus is used to treat drinking water. Tough plastic is preferable for preventing wear. The fluid is caused to flow in the direction of the arrows between the electrodes.

The electrically conductive materials of the electrodes 1, 2 have different electrochemical potentials such that when the body of electrically conductive fluid to be treated in the apparatus is interposed between the electrodes, as represented by the arrows, an electroconductive connection that develops an electric potential between the electrodes 1, 2 is established through the body of fluid by the capacitive effect described above, whereby the fluid is ionized. In the embodiment of FIG. 2, the electrodes are electrically isolated from one another in the apparatus so that the electroconductive connection of the electrodes is only established through the body of fluid to be treated. Such a condition also exists in the embodiments of FIGS. 3-5 which will be described in more detail below. Each of the embodiments of FIGS. 2-5 can thus be considered to be self-generating systems as no external energy is required to effect a voltage potential giving rise to the ionization of the fluid.

When the apparatus of FIG. 2, comprising a negative aluminum electrode 2 and a positive carbon electrode 1 each having a covering of electrically insulative material, was tested excellent results were observed with fluid having a high level of electroconductive capability. However, when the apparatus was tested with fluid having a low level of electroconductive capability, of approximately 200 to 300 $\mu$S/cm, reduced efficiency was apparent. It should be noted that when the electrodes of FIG. 1 without the cover of electrically insulative material were tested with fluid having a low degree of electroconductive capability of approximately 200 to 300 μS/cm, excellent results regarding the ionization of the fluid were observed; however, with fluid having a very high degree of electroconductive capability, the efficiency of ionization was very low. It became apparent from these tests that some form of control was necessary to balance the performance of the device to suit a most desirable range of fluid electroconductivity levels. Three methods of control were tested:

(1) Providing the covering of electrically insulative material over only one of the electrodes;
(2) Providing an electrically conductive connection between two electrodes each having a covering of electrically insulative material; and
(3) Providing an electrically conductive connection between an uncovered electrode and one electrode covered with electrically insulative material.

Figure 3:
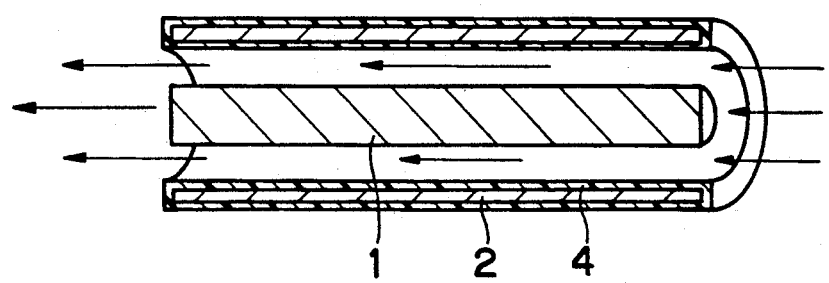
FIG. 3 is a perspective view, in section, of another embodiment of an apparatus for treating electrically conductive fluid according to the present invention.

In the embodiment of FIG. 3, only one of the electrodes (negative aluminum electrode) has a covering of electrically insulative material 4 extending around the entirety thereof. The electrically conductive material of the other electrode 1 (the positive carbon electrode) is exposed to the space between the electrically conductive materials of the electrodes such that it is not sealed against direct physical contact with the fluid to be treated. When such an embodiment was tested with fluid having a low degree of electroconductive capability, of about 200 to 300 μS/cm, the results observed showed an acceptable performance with regard to the ionization of the fluid. However, the effectiveness of this embodiment with fluids having high degrees of electroconductive capability is comparatively small.

Figure 4:
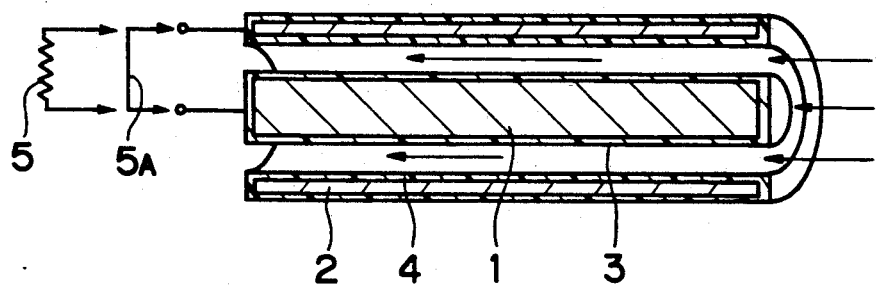
FIGS. 4 and 5 are perspective views, in section, corresponding to FIGS. 2 and 3, respectively, but showing the additional feature of electrical connection means for establishing a direct electrical connection of the electrodes according to the present invention.

In the embodiment of FIG. 4, each of the electrodes 1, 2 has a covering 3, 4 of electrically insulative material extending around substantially the entirety thereof so that each of the electrodes 1, 2 are sealed from direct contact with the body of fluid to be treated in the apparatus. Electrical connection means 5 or 5A extend between and are directly electrically connected to the electrically conductive materials of the electrodes 1, 2. Thus, an electric circuit is established in the embodiment of FIG. 4 from one of the electrodes, through the body of fluid to be treated, to the other of the electrodes, and back to said one of the electrodes via the electrical connection means 5 or 5A. The electrical connection means can include a resistor 5 or can consist of an electrical lead wire 5A.

A series of tests employing different electric resistive levels were carried out with the embodiment of FIG. 4. The different electric resistive levels range from a high resistance of 1,000,000 ohms down to the direct electrical connection of 0 ohms. It was found that a range of control of the effectiveness of the device over fluids varying from high degrees of electricoconductive capability to low degrees of electroconductive capability could be obtained by applying different resistive levels between the two covered electrodes.

Figure 5:
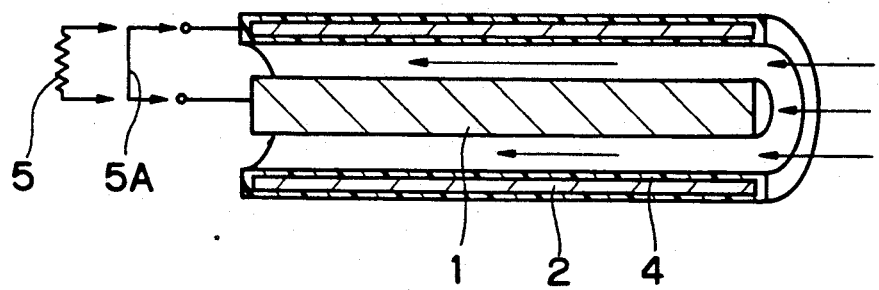

The embodiment of FIG. 5 is the same as that of FIG. 4 except in that only one of the electrodes (negative aluminum electrode) has a covering 4 of electrically insulative material extending around substantially the entirety thereof. Again, tests were conducted using a range of electric resistance from 1,000,000 ohms to 0 ohms. These tests showed that a suitable control could be obtained for fluids varying from a high degree of electroconductive capability to a low degree of electroconductive capability. However, the values of resistance employed were required to be greater than when both the positive and negative electrodes were covered with electrically insulative material as in the embodiment of FIG. 4.

Again, reference is made herein to the fact that the resistor 5 or direct electrical connection by electrical lead wire 5A is used as a control on the range of electroconductive capabilities of the fluids over which the apparatus of the present invention is effective. As discussed above, a resistor or direct electrical connection between the electrodes in prior devices, in which the electrodes were both fully exposed to contact the fluid, was employed as a current control device.

In the embodiments of FIGS. 2-5 in which a self-generated electric potential is produced between the electrodes, at least one of which has a covering of electrically insulative material extending around substantially the entirety thereof, the resulting ionization of the fluid may be explained by reason that an electron under certain conditions is able to pass through a thin insulative barrier. However, there would be only a small flow of electrons under such a condition and therefore the presence of electric current would be extremely limited When aluminum and carbon electrodes are employed, the electron flow is from the aluminum electrode to the carbon electrode. Thus, if the aluminum and carbon electrodes are provided with electrically insulative material, the amount of electrons flowing from the aluminum electrode to the carbon electrode is severely limited or not completely stopped. There will still be a number of electrons escaping through the thin insulative material and passing between the electrodes through the fluid. If only one electrode, for example, the aluminum electrode, is covered with the electrically insulative material, and the other electrode (carbon electrode) is left exposed, the exposed carbon electrode will be free to strongly receive electrons thereby inducing an increase in the number of electrons flowing through the electrically insulative material covering the aluminum electrode.

When the electrical connection means, such as 5 or 5A, external of the fluid to be treated is connected between the electrodes, the electrical pressure is increased resulting in a corresponding increase in the number of electrons escaping through the electrically insulative material.

As the discussion makes evident, the electroconductive capability of the fluid is a very important factor because the fluid is the principle medium between the electrodes. When the electroconductive capability of the fluid is high, the resistance to electric flow is low. In fluid having a very high degree of electroconductive capability, the fluid electric resistance may be as low as a few ohms per square centimeter. This fact of course promotes a flow of electrons between the electrodes and an increase in the number of electrons escaping through the electrically insulative material.

In the above embodiments discussed with reference to FIGS. 2-5, i.e. in the self-generating systems, the fluid acts as an electrolyte to produce the required voltage potential between the electrodes and also acts in part as a dielectric between the electrodes in facilitating the capacitive effect.

It became apparent that desirable results could also be achieved by connecting the electrodes to an external source of electric energy. In such a case, the electrodes could be made of any electroconductive materials, even the same material. Furthermore, in the initial research of the self-generating systems described above, the electric potential was polarized. However, when an external source of electric energy is applied, the electric potential could be either polarized or alternating. In such a case, the fluid being treated would act only as a dielectric, and not as both an electrolyte and dielectric as in the above-described self-generating systems.

Figure 6:
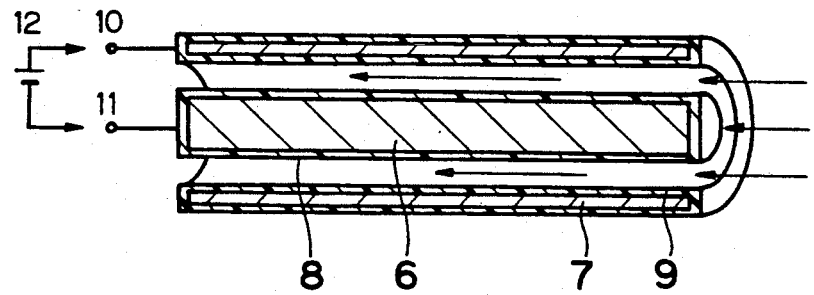
FIG. 6 is a perspective view, in section, of another embodiment of an apparatus for treating electrically conductive fluid according to the present invention, in which an external source of electric energy is to be connected to the electrodes.

In the embodiment of FIG. 6, reference numeral 6 designates a first electrode of electrically conductive material and reference numeral 7 designates a second electrode of electrically conductive material that is spaced (radially) from the electrically conductive material of the first electrodes. At least one of the electrodes, and in this case both of the electrodes, has a covering 8 or 9 of electrically insulative material extending around substantially the entirety thereof so as to seal the respective electrode(s) from direct contact with the body of fluid to be treated in the apparatus. External electric supply connection means in the form of contacts 10, 11 are electrically connected to the electrodes 7, 6, respectively, for connecting the electrodes to an external source of electric energy. Thus, when a body of electrically conductive fluid to be treated in the apparatus is interposed between the electrodes, as shown by the arrows, and a source of electric energy 13 is connected to the electrodes via electrical contacts 10, 11, an electroconductive connection between the electrodes is established through the body of fluid by a capacitive effect whereby the fluid is ionized.

The embodiment of FIG. 6 was tested using first and second electrodes of the same electroconductive materials, e.g. copper, iron, carbon, etc. The results of these tests were comparable with those of the self-generating systems in which the electrodes having different electrochemical potentials, e.g. aluminum and carbon, were employed.

It is possible to provide a range of control in the embodiment of FIG. 6 to accommodate various degrees of electroconductive capabilities of fluid by simply adjusting the level of voltage potential provided by the external electric energy source 13.

Figure 7:
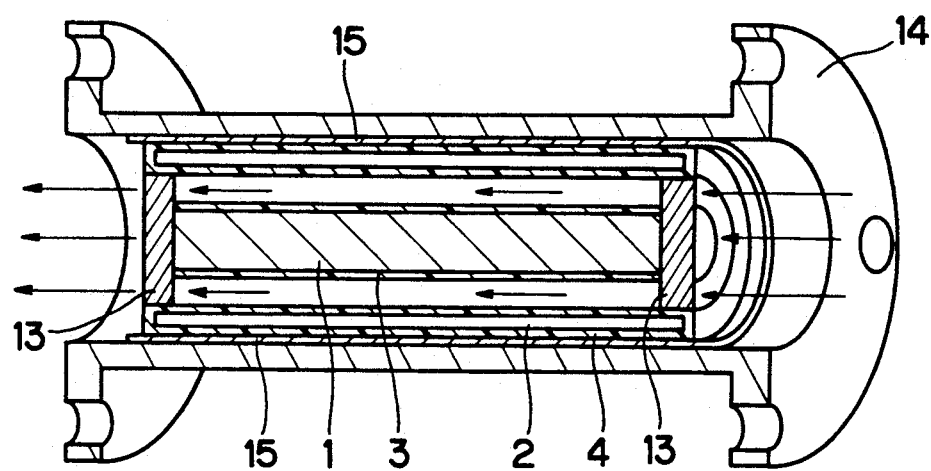
FIG. 7 is a perspective view, in section, of a practical form of an apparatus for treating electrically conductive fluid according to the present invention.

FIG. 7 shows the practical form of the apparatus according to the present invention. In FIG. 7, reference numeral 14 designates a pipe in which electrodes 1, 2 are disposed. As shown in the figure, the pipe 14 has flanges at the ends thereof which secure the apparatus in-line to fluid piping. At least one electrically insulative supporting member 13 extends diametrically of the pipe 14 and is connected to the rod-shaped electrode 1 so as to support the rod-shaped electrode 1 within the pipe 14. In the embodiment shown in FIG. 7, each of the electrodes 1, 2 has a respective covering 3, 4 of electrically insulative material extending around substantially the entirety thereof. Reference numeral 15 designates a secondary layer of electrical insulation.

Although the present invention has been fully described in connection with the preferred embodiments thereof with reference to the accompanying drawings, it is to be noted that numerous changes and modifications will become apparent to those of ordinary skill in the art. For example, although the preferred embodiments have been described with respect to an outer tubular electrode and rod-like inner electrode extending axially within the outer tubular electrode, other forms of the electrode may be employed. In addition, materials other than those specifically disclosed can be employed as the electrically conductive material of the electrodes. Accordingly, such changes and modifications, which are seen to be within the true spirit and scope of the present invention, are to be understood as encompassed by the present invention as defined by the appended claims.

What is claimed is:

1. Apparatus for treating electrically conductive fluid, said apparatus comprising:

self-generating means for producing an electric potential without an external electric power supply, said self-generating means including a positive electrode and a negative electrode;

said positive electrode being of electrically conductive material;

said negative electrode being of electrically conductive material that is spaced from the electrically conductive material of said positive electrode;

at least one of said electrodes having a covering of electrically insulative material extending around substantially the entirety thereof so as to seal said at least one electrode from direct contact with a body of electrically conductive fluid to be treated in the apparatus; and the electrically conductive material of said electrodes having different electrochemical potentials such that when a body of electrically conductive fluid to be treated in the apparatus is interposed between said electrodes only said electric potential develops an electroconductive connection between said electrodes through the body of fluid by a capacitive effect whereby the fluid is ionized.

2. Apparatus for treating electrically conductive fluid as claimed in claim 1, wherein said self-generating means consists of said electrodes, and each of said electrodes has a said covering of electrically insulative material extending around the entirety thereof so that each of said electrodes is sealed from direct contact with a body of fluid to be treated in the apparatus, said electrodes being electrically isolated from one another in the apparatus so that only said electrodes develop said electroconductive connection and said electroconductive connection is only established through the body of fluid to be treated.

3. Apparatus for treating electrically conductive fluid as claimed in claim 1, wherein said self-generating means consists of said electrodes, and only one of said electrodes has a said covering of electrically insulative material extending around the entirety thereof, the electrically conductive material of the other of said electrodes is exposed to the space between the electrically conductive materials of said electrodes, said electrodes being electrically isolated from one another in the apparatus so that only said electrodes develop said electroconductive connection and said electroconductive connection is only established through the body of fluid to be treated.

4. Apparatus for treating electrically conductive fluid as claimed in claim 1, wherein each of said electrodes has a said covering of electrically insulative material extending around substantially the entirety thereof so that each of said electrodes is sealed from direct contact with a body of fluid to be treated in the apparatus, and further comprising electrical connection means extending between and directly electrically connected to the electrically conductive materials of said electrodes for establishing an electric circuit in the apparatus from one of said electrodes, through the body of fluid to be treated, to the other of said electrodes, and to said one of said electrodes via said electrical connection means.

5. Apparatus for treating electrically conductive fluid as claimed in claim 4, wherein said electrical connection means includes a resistor.

6. Apparatus for treating electrically conductive fluid as claimed in claim 4, wherein said electrical connection means consists of an electrical lead wire.

7. Apparatus for treating electrically conductive fluid as claimed in claim 1, wherein only one of said electrodes has a said covering of electrically insulative material extending around substantially the entirety thereof, and further comprising electrical connection means extending between and directly electrically connected to the electrically conductive materials of said electrodes for establishing an electric circuit in the apparatus from one of said electrodes, through the body of fluid to be treated, to the other of said electrodes, and to said one of said electrodes via said electrical connection means.

8. Apparatus for treating electrically conductive fluid as claimed in claim 7, wherein said electrical connection means includes a resistor.

9. Apparatus for treating electrically conductive fluid as claimed in claim 7, wherein said electrical connection means consists of an electrical lead wire.

10. Apparatus for treating electrically conductive fluid as claimed in claim 1, wherein one of said positive and said negative electrodes is rod-shaped.

11. Apparatus for treating electrically conductive fluid as claimed in claim 10, wherein the other of said electrodes is tubular and extends around said one of said electrodes.

12. Apparatus for treating electrically conductive fluid as claimed in claim 11, and further comprising a pipe in which said electrodes are disposed, said pipe having attaching means for securing the apparatus in-line to piping, and at least one electrically insulative supporting member extending diametrically of said pipe and connected to the rod-shaped electrode so as to support the rod-shaped electrode within said pipe.

13. Apparatus for treating electrically conductive fluid as claimed in claim 12, wherein each of said electrodes has a said covering of electrically insulative material extending around substantially the entirety thereof.

14. Apparatus for treating electrically conductive fluid as claimed in claim 1, wherein the electrically conductive material of said negative electrode is aluminum, and the electrically conductive material of said positive electrode is carbon.

15. A method of treating electrically conductive fluid, said method comprising:

producing an electric potential without the use of any external electric power supply by providing a positive electrode of electrically conductive material, and by providing a negative electrode of electrically conductive material that is spaced apart from the electrically conductive material of said positive electrode, and which has an electrochemical potential that is different from that of the electrically conductive material of said positive electrode, at least one of said electrodes having a covering of electrically insulative material extending around substantially the entirely thereof so as to seal said at least one electrode from direct contact with a body of electrically conductive fluid to be treated in the apparatus; and causing a body of electrically conductive fluid to flow over said electrodes so that the electric potential produced by said electrodes develops an electroconductive connection of said electrodes through the body of fluid by a capacitive effect which causes the body of electrically conductive fluid to be ionized.

16. A method of treating electrically conductive fluid as claimed in claim 15, wherein the step of producing an electric potential consists of providing positive and negative electrodes electrically isolated from one another and each having a said covering of electrically insulative material extending around the entirety thereof so that each of said electrodes are sealed from direct contact with a body of fluid to be treated in the apparatus, and so that said electroconductive connection is only established through the body of fluid.

17. A method of treating electrically conductive fluid as claimed in claim 15, wherein the step of producing an electric potential consists of providing positive and negative electrodes electrically isolated from one another and only one of which has a said covering of electrically insulative material extending around the entirety thereof so that the electrically conductive material of the other of said electrodes is exposed to the space between the electrically conductive materials of said electrodes, and so that said electroconductive connection is only established through the body of fluid.

18. A method of treating electrically conductive fluid as claimed in claim 15, wherein the step of producing an electric potential consists of providing positive and negative electrodes directly electrically connected to one another and each of which has a said covering of electrically insulative material extending around substantially the entirety thereof so that each of said electrodes are sealed from direct contact with a body of fluid to be treated in the apparatus, and so that an electric circuit is established from one of said electrodes through the body of fluid to be treated, to the other of said electrodes, and to said one of said electrodes.

19. A method of treating electrically conductive fluid as claimed in claim 15, wherein the step of producing an electric potential consists of providing positive and negative electrodes directly electrically connected to one another and only one of which has a said covering of electrically insulative material extending around substantially the entirety thereof so that the electrically conductive material of the other of said electrodes is exposed to the space between the electrically conductive materials of said electrodes, and so that an electric circuit is established from one of said electrodes through the body of fluid to be treated, to the other of said electrodes, and to said one of said electrodes.

20. A method of treating electrically conductive fluid as claimed in claim 15, wherein the step of causing a body of electroconductive fluid to flow comprises connecting said electrodes in-line with piping of a fluid system.

21. A method of treating electrically conductive fluid as claimed in claim 15, wherein the steps of providing the electrodes comprise providing a negative electrode of aluminum and a positive electrode of carbon.

* * * * *